3,379,677
ULTRAVIOLET LIGHT STABILIZERS FOR
PLASTIC MATERIALS
Hans Dressler, Pitcairn, and Kenneth G. Reabe, Delmont,
Pa., assignors to Koppers Company, Inc., a corporation
of Delaware
No Drawing. Filed Feb. 28, 1966, Ser. No. 530,335
5 Claims. (Cl. 260—45.8)

ABSTRACT OF THE DISCLOSURE

Plastic materials such as polyester resins, polyvinyl chloride, polyvinyl acetate, polystyrene, copolymers of vinylidene and vinyl chloride, cellulose acetate, nitrocellulose and ethylcellulose stabilized against degradation caused by exposure to ultraviolet light, containing as the ultraviolet light stabilizer a 2-thiophene-alpha-(phenylsulfonyl)acrylonitrile derivative. The ultraviolet light stabilizer is generally present in an amount between 0.01 and 5 percent by weight of the plastic material.

---

This invention relates to ultraviolet light stabilizers for plastics. In one specific aspect it relates to plastic compositions stabilized against degradation resulting from exposure to ultraviolet radiation.

It is well known that many plastic materials tend to undergo deterioration upon exposure to ultraviolet radiation. Light having wavelengths of about 290–400 millimicrons causes photocatalyzed changes, such as yellowing or embrittlement, in unstabilized polymers. This is particularly undesirable for colorless, translucent, and transparent plastics which are required to withstand long exposure to sunlight. To overcome this problem it is usually necessary to stabilize plastics, such as for use in translucent roofing, transparent structures, protective coatings, impact-resistant windows, and decorative structures, which are subject to prolonged exposure to ultraviolet radiation.

In recent years organic compounds have become available which can absorb ultraviolet light and convert it to less harmful forms of energy, such as heat, vibrational energy, or less harmful radiation. These organic stabilizers, in addition to absorbing ultraviolet radiation in the selected range for the plastic material being treated, must be compatible with the plastic, have little or no initial color, be reasonably inexpensive, be chemically stable, and have a low toxicity, especially for stabilizing plastics used in the food industry.

As a general rule, an effective ultraviolet light stabilizer should have a molar extinction coefficient ($\epsilon$) of about 10,000; that is, the log $\epsilon$ of the molar extinction coefficient is equal to or greater than 4.0 in the 300–400 millimicron spectral region to have potential value as an ultraviolet light stabilizer for plastics. However, individual plastics are generally most susceptible to deterioration by radiation of particular wavelengths. Thus, polyethylene and polystyrene are susceptible to radiation having a wavelength of 300–320 millimicrons, while polypropylene is most sensitive to radiation at 370 millimicrons. One disadvantage of presently available commercial stabilizers is that their extinction coefficient is too low over a broad band in the ultraviolet light region to be effective for general use.

Quite surprisingly, we have discovered that certain 2-thiophene-α-(phenylsulfonyl)acrylonitrile derivatives are compatible with a large number of plastic materials and exhibit outstanding ultraviolet light absorbing properties over a wide range. These compounds do not impart any substantial color to transparent, colorless plastics.

It is therefore an object of the present invention to provide a composition which is resistant to degradation by ultraviolet radiation.

It is another object of the present invention to provide plastic compositions containing the 2-thiophene-α-(phenylsulfonyl)acrylonitrile derivatives which are substantially resistant to ultraviolet deterioration.

In accordance with the present invention, we have discovered that derivatives of 2-thiophene-α-(phenylsulfonyl)acrylonitrile are particularly useful as ultraviolet light stabilizing agents for plastic materials.

Useful 2-thiophene-α-(phenylsulfonyl)acrylonitriles are compounds having the formula:

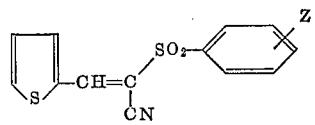

In the above formula Z is hydrogen, lower alkyl radical having from 1–4 carbon atoms, or lower alkoxy having from 1–4 carbon atoms.

The ultraviolet light stabilizer of the present invention can be readily incorporated into the plastic material by various standard procedures. In one technique the dry stabilizer in powdered form is mixed with a powdered or granular plastic and the mixture is then appropriately treated by molding or extruding. In another procedure an aqueous suspension or emulsion of finely divided polymeric material may be admixed with a suspension or emulsion of the stabilizing agent. Alternatively, it is possible to spray or mix a polymeric material in powdered or granular form with a solution or dispersion of the ultraviolet light-absorbing agent in an appropriate solvent, such as hexane or benzene. It is also possible to incorporate the ultraviolet light-absorbing agent in a finished article by introducing the plastic material into a bath containing the ultraviolet light-absorbing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the agent absorbing ultraviolet rays in a solvent or dispersant by any standard technique.

The plastic material should contain a stabilizing amount of the ultraviolet light-absorbing agent; that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 and 5 percent by weight of the plastic material and preferably between 0.1 and 4 percent by weight.

The stabilizing agent imparts protection against ultraviolet radiation to numerous plastic materials which are sensitive to ultraviolet light. These include, for example, clear films made of polyester resins, polyvinyl chloride, and cellulose acetate, which are used in packaging dyed textile articles and automobile seat covers. The agent also protects flame-resistant, halogen-containing polyesters and styrene-modified maleate glycol resins used in the preparation of glass fiber-reinforced structural panels which are subject to discoloration on outdoor exposure. The ultraviolet stabilizer is effective for protecting polyethylene, polypropylene, polystyrene, polyvinyl acetate, polyvinyl chloride, copolymers of vinyl chloride and vinylidene chloride, cellulose resins, such as nitrocellulose, ethylcellulose, and cellulose acetate, and numerous other materials. The agent can be used alone or together with other additives, such as fillers, antioxidants, pigments, etc.

The invention is further illustrated by the following examples:

Example I

A mixture of 3.6 grams (0.02 mole) of (phenylsulfonyl)acetonitrile, 2.3 grams (0.02 mole) of 2-thiophene carboxaldehyde, 10 ml. of absolute ethanol, and 2 drops of piperidine were heated at 80–85° C. for 3 hours. The mixture was then cooled to 25° C. and filtered, yielding 4.7 grams of a light brown solid of melting point 106–109° C. The crude product was recrystallized from 95 percent ethanol using activated charcoal to decolorize the product. 2.6 grams of purified product of melting point 111–112° C. was recovered. The infrared spectrum of the product confirmed it to be 2-thiophene-α-(phenylsulfonyl)acrylonitrile having the formula:

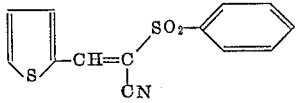

The product is an excellent ultraviolet light stabilizer. It has a molar extinction coefficient of log ε equal to or greater than 4.0 in the spectral range of 315 to 365 millimicrons.

Example II

The product of Example I was tested to determine its ability to stabilize polystyrene against ultraviolet light degradation. The stabilizer in an amount of 0.1 percent by weight was blended with 100 parts by weight of polystyrene beads by rolling in a jar mill. The stabilized sample and a control sample were extruded into pellets from which discs 2 inches in diameter by ⅛ inch thick were molded by injection molding. These molded discs were then exposed to ultraviolet radiation under a 325 watt Hanovia lamp for 120 hours. A Yellowness Index, which represents the relative degree of yellow coloration based upon spectrophotometric analysis, was determined for the samples. The difference in the Yellowness Index before and after exposure or the amount of discoloration caused by the ultraviolet radiation is designated as the "Yellowness Factor." Results of the test are given in the table below.

TABLE I

| Stabilizer | Weight Percent | Yellowness Factor |
|---|---|---|
| 2-thiophene-α-(phenylsulfonyl)acrylonitrile | 0.1 | 1.7 |
| Control | None | 5.8 |

Similar results are obtained when polyethylene, polypropylene, copolymers of vinylidene chloride and vinyl chloride, or styrene-modified phthalic-maleic-glycol type polyesters are used in the foregoing example.

We claim:
1. A polymeric composition stabilized against ultraviolet degradation comprising a polymer selected from the group consisting of polyethylene, polypropylene, polystyrene, polyvinyl acetate, polyvinyl chloride, copolymers of vinylidene chloride and vinyl chloride, nitrocellulose, ethylcellulose, cellulose acetate and polyester resins and containing at least about 0.01% of a stabilizer having the formula:

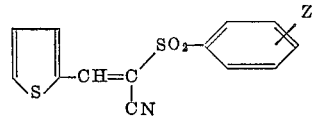

wherein Z is a member selected from the group consisting of hydrogen, lower alkyl radicals having from 1–4 carbon atoms and lower alkoxy radicals having from 1–4 carbon atoms.

2. The polymeric composition of claim 1 wherein the amount of stabilizer is 0.01 to 5 percent by weight of said polymer.

3. The stabilized polymeric composition of claim 1 wherein Z is hydrogen.

4. The stabilized polymeric composition of claim 1 wherein the polymer is polystyrene.

5. A polymeric composition stabilized against ultraviolet degradation comprising polystyrene and from 0.01 to 5.0 percent by weight of an ultraviolet light stabilizer having the formula:

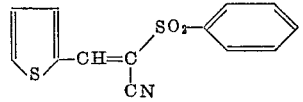

References Cited

UNITED STATES PATENTS

| | | | |
|---|---|---|---|
| 3,052,636 | 9/1962 | Strobel et al. | 260—45.9 |
| 3,337,357 | 8/1967 | Strobel et al. | 106—176 |

ALLAN LIEBERMAN, *Primary Examiner.*